Figure 1:
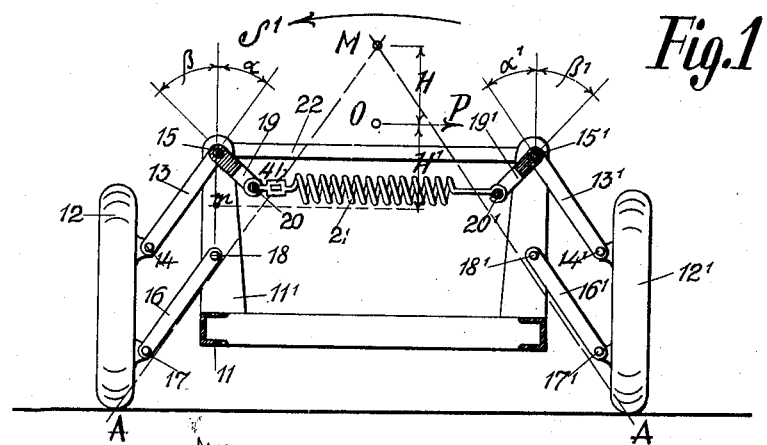

Jan. 9, 1940.                S. FISCHER                2,186,065
                     SPRINGING SYSTEM OF VEHICLES
                      Filed Oct. 15, 1936         2 Sheets-Sheet 1

INVENTOR
STEFAN FISCHER
BY Walter S. Bleistein
ATTORNEY

Jan. 9, 1940.  S. FISCHER  2,186,065

SPRINGING SYSTEM OF VEHICLES

Filed Oct. 15, 1936  2 Sheets-Sheet 2

INVENTOR
STEFAN FISCHER
BY Walter S. Bleistein
ATTORNEY

Patented Jan. 9, 1940

2,186,065

UNITED STATES PATENT OFFICE 2,186,065

SPRINGING SYSTEM OF VEHICLES

Stefan Fischer, Prague-Dejvice, Czechoslovakia, assignor to Alex Selig, Prague, Czechoslovakia Application October 15, 1936, Serial No. 105,707
In Czechoslovakia October 19, 1935

11 Claims. (Cl. 280—124)

This invention relates to the springing of vehicles, particularly of motor vehicles, having wheels suspended independently of each other from the vehicle frame by links, link parallelograms, link quadrilaterals, or the like, and a spring or a plurality of springs inserted substantially between the links and either positively or kinematically connected to the links of two opposite wheels.

The invention aims to provide a structure in which the stiffness of the springing progressively increases with the increase of the lifting of the wheels or the lowering of the vehicle body, and differs when both wheels move vertically in the same sense, from the stiffness prevailing when the wheels move in opposite directions, so that, on the one hand, the vertical oscillation of the vehicle body will be decreased with the resistance of the springing gradually increasing at a higher than linear rate, and that, on the other hand, the lateral springing of the vehicle, for instance in a road curve, is effected with a stiffness of the spring other than that with which the vehicle is sprung when passing obstacles.

Another object of the invention consists in the spring rebound forces acting against the longitudinal axis of inertia of the spring vehicle masses substantially in a horizontal direction and with a small lever arm due to a particular arrangement of the springs in relation to the points of suspension of the wheels at the frame, whereby only small angular accelerations of the sprung masses about the longitudinal axis of inertia, and consequently only small transverse oscillations of the vehicle body may occur when one wheel or both wheels of the same side of the vehicle oscillate in vertical direction.

Another object of the invention is to place the instantaneous center about which the wheels turn when swinging vertically, above the center of gravity of the sprung masses so that the body of the vehicle when passing a road curve tends to tilt towards the inside of the curve rather than towards the outside as usual, thus considerably decreasing the danger of turning over in the curve at high speed, and increasing the passenger's feeling of safety.

The invention consists in the fact that the links carrying the wheels are directed from their joints at the vehicle frame or body obliquely downward at an angle of approximately between 20 to 40° with the vertical and that the spring links, i. e., the links to which the vehicle springs are attached run obliquely downward towards the vehicle's center plane if tension springs are used, or obliquely upwards from the vehicle's center plane if compression springs are used.

The invention furthermore consists in a structure of the named type in which the direction of the spring rebound forces is substantially horizontal and above the horizontal plane through the wheel centers, and in which the vehicle body including the chassis frame is so mounted that its lower edge is below the aforementioned plane.

Furthermore, auxiliary springing means may be provided between the frame or the parts attached thereto, and auxiliary spring links connected either positively or kinematically to the wheel links or the main spring links, said auxiliary spring links being directed obliquely in relation to the direction of the greatest active force of the auxiliary springing means, and having an inclination with respect to the named direction of force other than the main spring links have with respect to the axis of the main spring. The inclination may be so chosen, as the case may be, that the auxiliary springing assists the main spring with progressively increasing or decreasing force.

Figure 2:
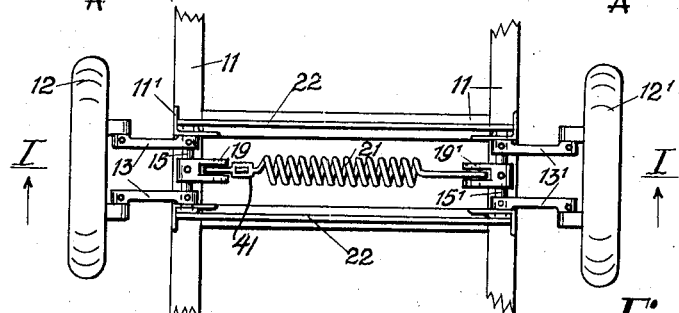
Figure 3:
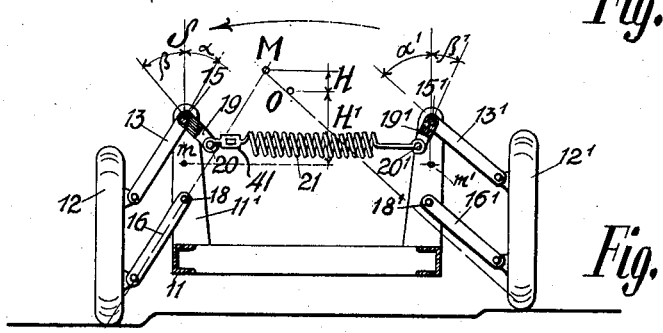
Figure 4:
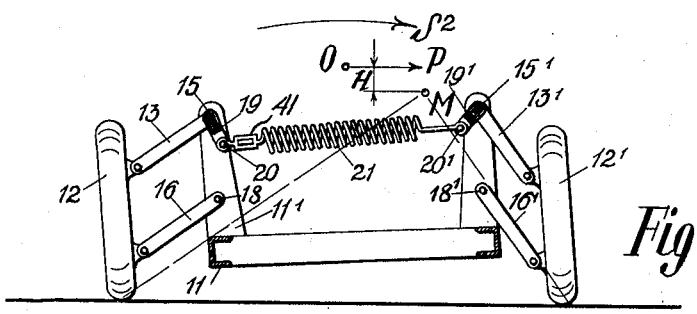
Figure 5:
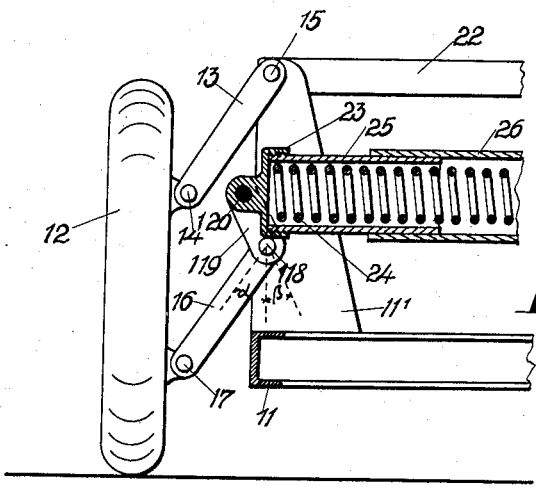
Figure 6:
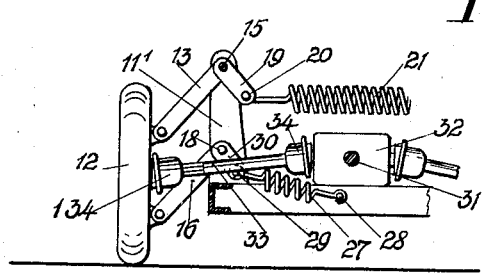
Figure 7:
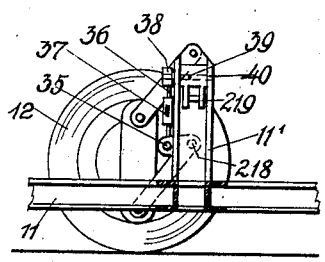
Figure 8:
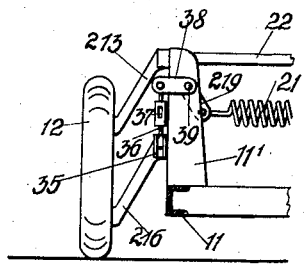

Further objects and details of the invention will be apparent from the description hereinafter of embodiments illustrated by way of example in the accompanying drawings in which are Fig. 1 a section along line I—I of Fig. 2, of a vehicle chassis having wheels which are sprung by means of a tension spring according to the invention;

Fig. 2 a fragmentary plan view thereof;

Fig. 3 a section similar to Fig. 1 in which the wheels are vertically moved in opposite directions;

Fig. 4 a section similar to Fig. 2, in the position of the chassis when passing a curve of the road;

Fig. 5 a fragmentary section similar to Fig. 1, of another embodiment of the invention in which a compression spring is provided;

Fig. 6 a section similar to Fig. 1 of another embodiment in which a main tension spring and an auxiliary tension spring are provided;

Fig. 7 a fragmentary longitudinal section of another embodiment, in which the wheels swing in planes parallel to the longitudinal axis of the vehicle; and Fig. 8 a fragmentary transverse section of the embodiment illustrated in Fig. 7.

In the embodiment of Figs. 1 and 2, the low level chassis frame 11 is provided with upright members or brackets 11¹ rigidly secured thereto. The wheels 12 and 12¹ are articulately connected to the brackets by pairs of links or guides 13, 16 and 13¹, 16¹ respectively. The links or guides are jointed to the wheel carriers, i. e., those parts to which the axles of the wheels are attached by means of pins 14, 17 and 14¹, 17¹ respectively, and to the frame brackets 11¹ by means of pins 15, 18 and 15¹, 18¹ respectively. The top portions of the brackets 11¹ are connected to each other by means of tension members or rods 22. In the illustrated embodiment, links 13, 16 and 13¹, 16¹ respectively, together with the connecting lines of the centers of pins 14, 17 and 15, 18, and 14¹, 17¹ and 15¹, 18¹ respectively form link parallelograms constantly guiding the wheels 12, 12¹ when oscillating, parallel to their original position. In order, however, to decrease the track width other link polygons, such as trapezoids, may be used.

O is the center of gravity of the sprung masses, i. e., the chassis with the body (not shown), which are positioned so low that their lower edge, usually the lower edge of the chassis frame, lies below the horizontal plane through the wheel centers. As there exist vehicle structures in which chassis and body form an inseparable unit, I wish to have the term "chassis frame" occurring in this specification and the claims to be understood as covering that part of the vehicle to which the wheels are attached by means of the wheel suspension. M is the instantaneous center which lies in the point of intersection of the lines drawn from the points of contact A of the wheels 12, 12¹ with the road to the points where the prolongations of the links 13, 16 and 13¹, 16¹ respectively intersect. Since the associated links are parallel to each other, the last mentioned points of intersection lie in the infinity, and, consequently, the lines A—M are parallel to the links 13 and 13¹ respectively. In straight riding, the instantaneous center M lies in the vertical center plane of the vehicle and above the center of gravity O if the angles of inclination α and α¹ of wheel links 13 and 13¹ respectively are suitably chosen.

I have found out that it is advisable to make the angles of inclination α, α¹ approximately between 20° and 40°, depending upon the entire structure. This refers to the vehicle standing on a level. When both wheels swing in the same direction angles α and α¹ increase, and the instantaneous center gets closer to the center of gravity O.

Lever arms or spring links 19, 19¹ are secured on the pins 15 and 15¹ respectively which latter form the axles of the wheel links 13 and 13¹ respectively. A horizontally arranged coil spring 21 is jointed to the outer ends 20 and 20¹ of spring links 19 and 19¹ respectively. Means may be provided for making the spring tension adjustable. Such means may consist of a conventional turnbuckle 41 shown in Figs. 1 to 4 in the connection of the spring 21 with link 19.

The constant of this spring and angles α and α¹ are so chosen that the instantaneous center when altering its position as described above comes to lie not or only slightly below the center of gravity at the greatest amplitude of the oscillation of the wheels.

If the wheels are moved in relation to the frame in opposite directions due to an uneven road as indicated in Fig. 3, i. e., wheel 12 downward and wheel 12¹ upward, then, angle α will decrease and α¹ increase. In consequence, thereof, the points of attachment 20 and 20¹ of spring 21 turn about points 15 and 15¹ at the frame brackets, and the spring tension becomes relieved at the side of spring link 19 and augmented at the side of spring link 19¹. According to the invention, spring links 19 and 19¹ are directed towards the inside and downward at angles β and β¹ respectively with the vertical, angles β and β¹ being so chosen in Fig. 1 that the sums α+β and α¹+β¹ respectively are smaller than 90°. Hence, if the wheels move in opposite directions as supposed with reference to Fig. 3, the projection of the circular movement of point 20 upon the axis of the coil spring will be smaller than that of point 20¹. Consequently, the distance of point 20 from point 20¹ becomes greater than originally and the tension of spring 21 will be increased. However, spring 21 will be tensioned less than in the case of both wheels moving in the same upward direction, i. e., when points 20 and 21 move in opposite directions. Thus, spring 21 is less stiff when the wheels oscillate in opposite directions than it is when the wheels oscillate in the same direction, and, therefore, it also acts as compensating spring.

Now, the resultant of the spring rebound forces acting on the frame may be supposed to be running and effective in an almost horizontal direction above the horizontal plane through the wheel centers, near the bisecting points m and m¹ of the distance between the link points 15, 18 and 15¹, 18¹ respectively. Due to the described inclination of the links 13, 16 and 13¹, 16¹ respectively, and to the corresponding arrangement of the center of gravity O, lever arm H, of the resultant of the spring rebound forces in respect to the longitudinal axis of inertia of the sprung masses, which axis runs through the center of gravity in the longitudinal direction of the vehicle, becomes very small. Consequently, the torque acting upon the sprung masses in the direction of arrow S (Fig. 3) is also very small with the result that the danger of oscillations being created is very much reduced.

If the vehicle is passing for instance a left hand road curve the centrifugal force acts upon the sprung masses at the center of gravity in the direction P (Fig. 4). Since the instantaneous center M is above the center of gravity O when the vehicle steers from the straight road into the curve, the occurring moment of the centrifugal force P . H tends to turn the spring masses in the sense of arrow S¹ (see Fig. 1) whereby the vehicle body tilts in the direction towards the inside of the curve that is opposite to the tilting direction of the structures hitherto known. When the body is so tilting, the instantaneous center M gets closer to the horizontal plane through the center of gravity and may even come to lie below this plane at high speeds, simultaneously moving sideways from the longitudinal vertical plane through the center of gravity O (see Fig. 4). In such a case, the moment of the centrifugal force acts in the opposite direction, that means in the sense of arrow S² (see Fig. 4) whereby the sprung masses will be raised again so long until the moment of the centrifugal force becomes equal to the moment of the rebound spring forces. Thereby, the instantaneous center M moves again higher and approaches its original position.

Suddenly occuring forces, as road shocks, forces due to sudden alterations of the direction of the vehicle, and the like, will also cause only small moments due to the fact that the lever arms of the centrifugal force and the rebound force always remain small. These moments are insufficient to create a disagreeable oscillation of the sprung masses, which frequently is the cause of a dangerous side skidding.

When the wheels, 12, 12¹ oscillate, links 13, 19 and 13¹, 19¹ respectively are turned about their pivots 15 and 15¹ respectively at the frame; whereby the spring extension i. e. the projections of the circular motions of points 20 and 20¹ respectively upon the axis of spring 21, in relation to the rate of the turning angles about points 15 and 15¹ respectively will increase relatively more rapidly than the stroke of the wheels, i. e., the vertical components of the circular motions. In consequence thereof, the vehicle body will go down at a decreasing rate as the load increases. Hence follows that the relation between spring force and wheel load increases, and that the spring becomes harder and harder. This increasing hardness of the spring prevents the sprung masses of Figs. 3 and 4 from oscillating too far.

At a simultaneous action of the centrifugal force and of road shocks, two turning movements are kinematically caused. On the one hand, the non-sprung masses turn about the instantaneous center M, and, on the other hand, the sprung masses are subjected by the spring rebound forces to a turning acceleration about the longitudinal axis of inertia of the vehicle through O. Since points M and O in the suspension according to the invention always remain close to each other, no progressive augmentation of the vehicle oscillations will occur which frequently takes place with most of the conventional vehicles under the sudden action of combined forces.

Instead of a tension spring, a compression spring may be used as illustrated in Fig. 5. In this case, the spring link or lever arm 119 rigidly connected with the lower wheel link 16 by means of the axle 118 is directed upwardly and away from the car center. Angle α of the wheel link with the vertical is between 20° and 40° when the vehicle is standing on a level. The sum of this angle plus angle β between the spring link and the vertical is smaller than 90° in the illustrated embodiment. and, since a compression spring is used in this embodiment, the angle enclosed by link 16 and lever arm 119 is more than 90°. On pin 120 at the end of lever arm 119 a cup-like member 23 is mounted against which a compression spring 24 bears. Spring 24 is guided in telecopic sleeves 25 and 26. The right hand wheel suspension is arranged symmetrically with the illustrated left hand suspension. This embodiment operates in the same manner as that shown in Figs. 1 and 2.

In order to correct the compensating effect or the progressiveness of the springing if necessary, an auxiliary spring may be provided for each wheel between the frame and at least one of the links, according to the invention. Fig. 6 is an embodiment in which main and auxiliary springs are applied. The auxiliary spring 27 is articulately jointed to the frame at 28, and to a link or lever arm 30 at 29, link arm 30 being rigidly connected to link 16. In other respects, the suspension of the wheels is similar to that of Fig. 1. Link arm 30 is so directed in the illustrated embodiment that spring 27 acts progressively. If necessary, however, the progressiveness of the stiffness of the entire springing may be decreased by a suitably chosen inclination of link arm 30. Also a compression spring or a leaf spring may be used as auxiliary spring, and link arm 30 may be connected to link 13 instead of link 16. The auxiliary springs may be provided in the design of the vehicle in order to obtain a definite law of the springing, or they may be applied to the finished vehicle if the original springing does not satisfy, and is to be improved for this reason.

The embodiment further shows that the springing according to the invention may also be used with drive wheels. A transmission 32 driven by the vehicle's motor (not shown) through shaft 31 is mounted on frame 11. The transmission drives the wheel shafts 33 connected thereto by universal joints 34. Each shaft 33 is shiftable in the universal joint 134 by means of a tongue and groove connection, in order to make allowance for the alteration of the wheel track.

Spring links 19 and 30 may be rigidly connected to the wheel links as in the foregoing description of embodiments, or they may be kinematically connected according to Figs. 7 and 8. The latter connection is particularly useful with wheels which oscillate in planes parallel to the longitudinal plane of the vehicle. In the embodiment of Figs. 7 and 8 the lower wheel link 216 pivoted on the frame bracket 11¹ at 218 is provided with an arm 35 to the end of which an upright rod 36 is articulately jointed. The upper end of rod 36 is articulately jointed to the end of an arm 38 rigidly connected to a shaft 39. Shaft 39 runs parallel with the longitudinal plane of the vehicle, and is pivoted in bearings 40 secured to the frame bracket 11¹. One end of the spring link 219 is rigidly connected to shaft 39, and to the other end, spring 21 is attached which is also attached to the corresponding spring link (not shown) at the opposite wheel. Rod 36 may be made of two parts one of which having a left-hand thread, and the other one a right-hand thread, a turn-buckle sleeve 37 being screwed thereon. By turning sleeve 37 the angle of the links with the vertical may be adjusted within certain limits also at the finished car in order to obtain the most favorable character of the alteration of the spring stiffness. The kinematic connection of the wheel link with the spring link as described with reference to Figs 7 and 8 may also be used with the transversely swinging wheel links of Figs. 1 to 6.

The invention is not restricted to the embodiments described and illustrated in the foregoing, and alterations are possible within its scope. Instead of one spring, a plurality of springs may be used. The springs may be attached to the upper or to the lower wheel links. The springing may be used for steered wheels or wheels which are not steered, for drive wheels or idling wheels. The invention provides a springing which acts softly and progressively under all conditions of drive occurring in speedy vehicles, with a considerable increase of the safety against the action of combined transverse oscillations, for instance against the skidding of the vehicle. The invention applied to a car gives the passenger a feeling of a greater safety and comfort. The entire new structure is extremely simple and requires only a small number of simple and solidly mountable parts. It also offers an additional advantage in as much as due to the particular leverage, considerably weaker springs may be employed than in springing systems of conventional type.

I claim:

1. A springing system of a vehicle including a chassis frame, at least one pair of wheels and wheel carriers independently suspended at opposite sides of said chassis frame comprising at least one link member for each of the wheels, the upper end of each link member being articulately jointed to said chassis frame and the lower end to its associated wheel carrier, an arm for one of said link members of each of said opposite wheels, swingable in relation to said chassis frame and connected with its one end to its associated link member so as to swing together therewith, and a spring attached with its ends to the other ends of the opposite arms, said link members being so inclined with respect to a vertical line that the instantaneous center of the wheel oscillations lies above the vehicle's center of gravity when the latter rests on a level, said instantaneous center being defined as the point of intersection of two straight lines associated with the opposite wheels respectively, each of said straight lines passing through the point of contact of the associated wheel with the road and being parallel to the link member connected to the associated wheel, and said arms being so inclined and said spring being so dimensioned that said first mentioned point of intersection cannot travel considerably below the center of gravity when the wheels oscillate with respect to the chassis due to road shocks of non-abnormal force.

2. A springing system as claimed in claim 1 in which the lines connecting the points of attachment of each of said link members include with a vertical line acute angles ranging between 20 and 40 degrees when the vehicle is standing on a level.

3. A springing system of a vehicle including a chassis frame, at least one pair of wheels and wheel carriers independently suspended at opposite sides of said chassis frame comprising a link system for each of the wheels including two link members, said link members being downwardly inclined under all normal conditions of operation of the vehicle, and articulately jointed to said chassis frame with their upper ends, the lower ends of said link members being articulately jointed to the associated wheel carrier, an arm associated with each of said wheels, one end of said arm being connected with one of said link members so as to swing together therewith, and a tension spring attached with its ends to the other ends of the opposite arms, and arranged above the horizontal plane through the wheel centers, the last mentioned plane being above the lower edge of the chassis frame, and the points of attachment of said link members at the chassis frame being so chosen that the direction of the spring rebound forces is substantially horizontal and above the horizontal plane through the centers of the wheels.

4. A springing system as claimed in claim 5 in which the points of attachment of said link members at the chassis frame are so chosen that the substantially horizontal direction of the spring rebound forces passes between said points of attachment.

5. A springing system of a vehicle including a chassis frame, at least one pair of wheels, and wheel carriers independently suspended at opposite sides of said chassis frame comprising a link system for each of the wheels including two link members articulately jointed to said chassis frame with their upper ends, the lower ends of said link members being articulately jointed to the associated wheel carrier, an arm associated with each of said wheels, one end of said arm connected with one of said link members so as to swing together therewith, and a spring attached with its ends to the other ends of the opposite arms, said link members including with a vertical line acute angles ranging between 20 and 40 degrees when the vehicle is standing on a level, the horizontal plane through the wheel centers being above the lower edge of the chassis frame, and the points of attachment of said link members at the chassis frame being so chosen that the direction of the spring rebound forces is substantially horizontal and above the horiontal plane through the centers of the wheels.

6. A springing system of a vehicle including a chassis frame, at least one pair of wheels and wheel carriers independently suspended at opposite sides of said chassis frame comprising two link members one above the other one for each of the wheels, the upper end of each link member being attached to said chassis frame to swing in a transverse plane and the lower end to its associated wheel carrier, the acute angle of inclination of the lines which pass through the points of attachment of each of said link members to said chassis frame and to the respective wheel carrier in relation to a vertical line ranging between 20 and 40 degrees when the vehicle is standing on a level, an arm in rigid connection with the upper end of one of said two link members for each of said wheels, said arms being inclined downward and inward with respect to the vehicle, and a tension spring attached with its ends to the lower ends of said arms.

7. A springing system of a vehicle including a chassis frame, at least one pair of wheels and wheel carriers independently suspended at opposite sides of said chassis frame comprising two link members one above the other one for each of the wheels, the upper end of each link member being attached to said chassis frame to swing in a transverse plane, and the lower end to its associated wheel carrier, the acute angle of inclination of the lines which pass through the points of attachment of each of said link members to said chassis frame and to the respective wheel carrier in relation to a vertical line ranging between 20 and 40 degrees when the vehicle is standing on a level, an arm in rigid connection with the upper end of one of said two link members for each of said wheels, said arms being inclined upward and outward with respect to the vehicle, and a compression spring bearing with its ends against the upper ends of said arms.

8. A springing system of a vehicle including a chassis frame, at least one pair of wheels and wheel carriers independently suspended at opposite sides of said chassis frame comprising at least one link member for each of the wheels, the upper end of each link member being articulately jointed to said chassis frame and the lower end to its associated wheel carrier, an arm for one of said link members of each of said opposite wheels, swingable in relation to said chassis frame and connected with its one end to its associated link member so as to swing together therewith, a main spring attached with its ends to the other ends of the opposite arms, and at least two auxiliary springs, one for each wheel, each auxiliary spring being attached to said chassis frame and active upon one of said link members of its associated wheel so as to exert a torque thereupon in the same sense of turning as said main spring, said link members including with a vertical line acute angles ranging between 20 and 40 degrees when the vehicle is standing on a level.

9. A springing system of a vehicle including a chassis frame, at least one pair of wheels and wheel carriers independently suspended at opposite sides of said chasis frame, comprising at least one link member for each of the wheels, the upper end of each link member being articulately jointed to said chassis frame and the lower end to its associated wheel carrier, an arm for one of said link members of each of said opposite wheels, swingable in relation to said chassis frame and connected with its one end to its associated link member so as to swing together therewith, a spring attached with its ends to the other ends of the opposite arms, said link members including with a vertical line acute angles ranging between 20 and 40 degrees when the vehicle is standing on a level, second arms in connection with link members of each of said wheels, and auxiliary springs attached to said chassis frame and in engagement with said second arms, said second arms having an inclination other than said first mentioned arms.

10. A springing system as claimed in claim 9 in which the inclination of said second arms in relation to the direction of the maximal effective force of auxiliary springs differs from the inclination of the first mentioned arms in relation to the axis of said first mentioned spring.

11. A springing system of a vehicle including a chassis frame, at least one pair of wheels and wheel carriers independently suspended at opposite sides of said chassis frame comprising two link members one above the other one for each of the wheels, the upper end of each link member being attached to said chassis frame, and the lower end to its associated wheel carrier, the acute angle of inclination of said link members in relation to a vertical line ranging between 20 and 40 degrees, two first arms, one for each wheel, each of said first arms being in rigid connection with the upper end of the upper link member of its associated wheel, said first arms being inclined downward and inward with respect to the vehicle, a tension spring attached with its ends to the lower ends of said first arms, second arms connected to said lower link members, and auxiliary springs attached to said chassis frame and said second arms.

STEFAN FISCHER.